(12) United States Patent
Zahiri et al.

(10) Patent No.: US 10,005,129 B2
(45) Date of Patent: Jun. 26, 2018

(54) METHOD OF FORMING SEAMLESS PIPE OF TITANIUM AND/OR TITANIUM ALLOYS

(71) Applicant: FUTURE TITANIUM TECHNOLOGY PTY LTD, Melbourne (AU)

(72) Inventors: Saden Zahiri, Mt. Waverly (AU); Mahnaz Jahedi, Toorak (AU); Kevin Hooper, Southbank (AU); William Bardsley, Brighton (AU); Stefan Gulizia, Werribee (AU); Caixian Tang, Bulleen (AU)

(73) Assignee: FUTURE TITANIUM TECHNOLOGY PTY LTD, Melbourne (AU)

( * ) Notice: Subject to any disclaimer, the term of this patent is extended or adjusted under 35 U.S.C. 154(b) by 43 days.

(21) Appl. No.: 14/649,281

(22) PCT Filed: Nov. 29, 2013

(86) PCT No.: PCT/AU2013/001382
§ 371 (c)(1),
(2) Date: Jun. 3, 2015

(87) PCT Pub. No.: WO2014/085846
PCT Pub. Date: Jun. 12, 2014

(65) Prior Publication Data
US 2015/0345669 A1 Dec. 3, 2015

(30) Foreign Application Priority Data
Dec. 3, 2012 (AU) ................................ 2012905238

(51) Int. Cl.
*B22F 5/10* (2006.01)
*F16L 9/02* (2006.01)
(Continued)

(52) U.S. Cl.
CPC .............. *B22F 5/106* (2013.01); *B05D 1/02* (2013.01); *B21C 37/06* (2013.01); *B22D 11/00* (2013.01);
(Continued)

(58) Field of Classification Search
None
See application file for complete search history.

(56) References Cited

U.S. PATENT DOCUMENTS

| 3,670,400 A | * | 6/1972 | Singer .................... B22F 3/115 164/46 |
| 5,141,566 A | | 8/1992 | Kitayama et al. |
| 5,302,414 A | | 4/1994 | Alkhimov et al. |

FOREIGN PATENT DOCUMENTS

| WO | WO 2009/109016 A1 | 9/2009 | |
| WO | WO 2009109016 A1 * | 9/2009 | ............. B21C 37/06 |

(Continued)

OTHER PUBLICATIONS

International Search Report for PCT/AU2013/001382 dated Feb. 5, 2014.

*Primary Examiner* — Michael P Rodriguez
(74) *Attorney, Agent, or Firm* — RatnerPrestia

(57) ABSTRACT

This invention relates to a method of forming sections of seamless titanium or titanium alloy pipe. The method involves providing a substrate for forming pipe and a sleeve of a section of pipe on the substrate. The pipe section has an end from which the substrate projects. The pipe is formed by spraying particles of titanium or titanium alloy generally parallel to a longitudinal axis of the substrate to impact a face of the end and to cause particles to bond to and to accumulate on the pipe end to form pipe. The method further involves moving formed pipe longitudinally relative to the substrate to remove formed pipe from the pipe-forming substrate and continuing to spray titanium or titanium alloy (Continued)

particles onto the end face to cause further pipe to form continuously and integrally with the formed pipe. This enables a seamless titanium or titanium alloy pipe to be formed of any desired length.

15 Claims, 1 Drawing Sheet

(51) Int. Cl.
  *B21C 37/06* (2006.01)
  *B05D 1/02* (2006.01)
  *B22D 11/00* (2006.01)
  *C23C 24/04* (2006.01)
  *B22D 23/00* (2006.01)
  *B22F 3/18* (2006.01)
  *C22C 1/04* (2006.01)
  *C22C 1/08* (2006.01)
  *B05B 7/14* (2006.01)

(52) U.S. Cl.
  CPC .............. *B22D 23/003* (2013.01); *B22F 3/18* (2013.01); *C22C 1/0458* (2013.01); *C22C 1/08* (2013.01); *C23C 24/04* (2013.01); *F16L 9/02* (2013.01); *B05B 7/1486* (2013.01)

(56) References Cited

FOREIGN PATENT DOCUMENTS

WO   WO 2011/017752 A1   2/2011
WO   WO 2011017752 A1 *  2/2011   .............. B21C 37/06

\* cited by examiner

METHOD OF FORMING SEAMLESS PIPE OF TITANIUM AND/OR TITANIUM ALLOYS

CROSS REFERENCE TO RELATED APPLICATIONS

This application is the U.S. National Phase Application of PCT/AU2013/001382, filed Nov. 29, 2013, which claims priority to Australian Patent Application No. 2012905238, filed Dec. 3, 2012, the contents of such applications being incorporated by reference herein.

FIELD OF THE INVENTION

The present invention relates to a method of forming metal pipes and relates particularly to forming seamless metal pipes. More particularly, the invention relates to forming pipe of titanium and/or titanium alloys.

BACKGROUND

One method for forming seamless titanium or titanium alloy pipe, albeit in short sections, is disclosed in International patent application PCT/AU2009/000276 in the name of Commonwealth Scientific and Industrial Research Organisation ("CSIRO"), which is incorporated by reference herein. The contents of the CSIRO International application are incorporated herein by this reference.

This method utilises cold spray technology which involves spraying particles at high velocities onto a substrate to cause the particles to bond together. Typically the particles are accelerated to supersonic velocities to cause bonding on impact. The term "cold" arises because the method is carried out at temperatures below the melting point of the particles and of the substrate. Accordingly, the original structure and properties of the particles are maintained throughout the process. Therefore, pipe formed of the particles will have similar properties. The general concept of cold-spraying and an example of a cold-spraying apparatus are disclosed in U.S. Pat. No. 5,302,414. which is incorporated by reference.

The method disclosed in the CSIRO International application involves spraying fine particles of titanium or titanium alloy onto a cylindrical mandrel that is rotated about a longitudinal axis of the mandrel.

The particles are sprayed at supersonic velocities and bond together upon impact with the mandrel to build up a layer of titanium or titanium alloy depending on the composition of the particles. The extent of the build-up determines the wall thickness of the pipe.

The spray nozzle is arranged to direct particles along a radial line of the mandrel so the particles impact a curved surface of the mandrel generally perpendicular to the surface of the mandrel. The nozzle is moved lengthwise relative to the rotating mandrel so that particles are sprayed over length of the mandrel and so that a pipe is formed with substantially the same length as the mandrel. The mandrel is finally separated from the formed pipe.

An advantage of the method disclosed in the CSIRO International application is that the layer is continuous over the length of the cylindrical mandrel so that the layer forms a seamless pipe. The band strength of the pipe is, therefore, well suited to high pressure applications.

While the pipe is seamless, the overall length of the pipe is limited by the length of the mandrel. As there are practical limitations on the lengths of mandrels, pipes are also limited in length. Accordingly, this CSIRO method does not produce titanium or titanium alloy pipe in lengths that are practical as a replacement for long sections of steel pipe.

Short sections of titanium or titanium alloy pipe may be used to form an overall longer pipe. However, there is considerable cost involved in assembling a longer pipe because the short sections are difficult to weld together. While the CSIRO method can produce titanium or titanium alloy pipe more cost effectively than other methods, this benefit is off-set to an extent by the cost and difficulty associated with assembling longer lengths of pipe from a series of short section of seamless titanium pipe.

Accordingly, there is a desire to produce longer sections of titanium or titanium alloy pipe to reduce the practical disadvantages of assembling short sections.

Summary of Disclosure

In a first aspect, a method of forming sections of seamless titanium or titanium alloy pipe is provided. The method comprises the steps of:
(a) providing a substrate for forming pipe and a sleeve of a section of pipe on the substrate, the pipe section having an end from which the substrate projects;
(b) spraying particles of titanium or titanium alloy generally parallel to a longitudinal axis of the substrate to impact an end face of the end and to cause particles to bond to and to accumulate on the pipe end face to form pipe; and
(c) moving formed pipe longitudinally relative to the substrate to remove formed pipe from the pipe-forming substrate and continuing to spray titanium or titanium alloy particles onto the end face to cause further pipe to form continuously and integrally with the formed pipe, thereby enabling formation of a seamless titanium or titanium alloy pipe of a desired length.

The term "pipe-forming substrate" is a reference to a surface portion of a substrate. An underlying portion of the substrate may be formed of a different material, include heating or cooling structures or may be hollow.

The method enables formation of titanium or titanium alloy pipe to a desired length because the pipe is continuously formed and removed from the substrate. For practical purposes, the pipe may be formed in lengths suitable for transport, such as up to 16 meters or longer, or may be continuously formed and cut to predetermined lengths after the desired length has moved from the substrate during the forming process.

This method enables pipes to be formed with an internal diameter in the range of 1 mm to 1000 mm (typically). In addition, this method enables pipes to be formed with a wall thickness in the range of 0.1 mm to 50 mm (typically).

The method preferably involves evenly distributing sprayed particles over the face to cause even growth of the formed pipe by rotating the substrate and pipe relative to the particle spray.

Step (b) may involve spraying particles onto the end face via a plurality of spray nozzles.

The method may further comprise compressing formed pipe to reduce porosity of the formed pipe.

Research work carried out by the applicant has revealed that spray-formed pipe has pores associated with gaps between particles that impact and form the pipe. The porosity negatively impacts the overall strength of the pipe because the pores act as stress centre and assists to propagate cracks. However, the research work revealed that the porosity is reduced by compressing the formed pipe.

Suitable forces to compress the formed pipe vary depending on the depth of the deposited titanium layer between repetitive application of the force. This in turn depends on the speed of deposition, the rotational speed, the wall section thickness and the diameter of the pipe. Nevertheless, suitable compressive forces—pressure—are in the range of 10 to 1000 MPa.

The compressive force may be applied to an outwardly facing, circumferential curved surface of the pipe.

However, the compressive force is preferably applied to the location of particle accumulation. It is also preferable for the compressive force to be applied in the same direction that particles are sprayed.

Accordingly, the compressive force preferably is applied to the end face of the pipe.

Preferably, the compressive force is applied by a fixed roller to accumulated particles on the end face, whereby growth of the pipe causes longitudinal movement of formed pipe relative to the substrate.

The method further comprises controlling the compressive force.

The compressive force may be controlled by controlling friction between the substrate and the formed pipe, and optionally the pipe section or applying a load on the pipe opposite to the compressive load.

Controlling the friction may comprise selecting a substrate to provide sufficient friction to longitudinal movement of the formed pipe so that the compressive force applied by the roller causes compression of accumulated particles.

The applicant recognises that friction between the formed pipe and the substrate is affected by the extent to which the formed pipe bonds to the substrate. Without wishing to be bound by any particular theory, experimental work carried out by the applicant suggests, and it is the belief of the applicant, that bonding is affected by the following factors:
 (a) differential thermal expansion of the formed pipe and the substrate;
 (b) surface roughness of the substrate;
 (c) chemical bonding between the formed pipe and the substrate; and
 (d) titanium or titanium alloy "particle relaxation".

It is not clear to what extent each of these aspects contribute to overall bonding between the formed pipe and the substrate.

In view of this belief, the applicant anticipates that movement of the formed pipe relative to the substrate may be achieved by controlling the extent of bonding between the formed pipe and the pipe-forming substrate. It should be understood, however, that alternative options that enable movement of the formed pipe relative to the pipe-forming substrate are encompassed by the subject invention.

With the above factors in mind, the method may involve controlling the extent of bonding between formed titanium or titanium alloy pipe and the substrate to enable formed pipe to be moved relative to the substrate.

In regard to factor (a), it is believed that thermal bonding occurs when the titanium or titanium alloy particles are sprayed onto the substrate. In particular, it is believed that thermal bonding occurs if the substrate expands more than the formed pipe in the course of being exposed to the spray carrier gas which is at an elevated temperature.

One option for counteracting the thermal bonding effect may involve controlling the extent of bonding by heating the formed titanium or titanium alloy pipe to cause differential thermal expansion of the formed pipe relative to the substrate, thereby releasing the formed pipe from the pipe forming substrate and enabling the formed pipe to be moved relative to the substrate. The thermal differential may be caused preferentially by heating the formed titanium or titanium alloy pipe. Alternatively, the thermal differential may be caused by cooling the substrate causing a thermal differential between the formed pipe and the pipe forming substrate relative to the pipe.

Another option for counteracting the thermal bonding effect may involve controlling the extent of bonding by selecting a substrate having a co-efficient of thermal expansion that is less than the co-efficient of thermal expansion of the titanium or titanium alloy.

The substrate may be ceramic, glass, metal or composite.

In regard to factor (b), the applicant believes that surface morphology of the substrate affects the extent of bonding with the formed pipe. In particular, the applicant believes that the titanium or titanium alloy particles fill surface relief on the substrate with the effect that, at least in the longitudinal direction along the substrate, the formed pipe and the substrate mechanically interlock.

Accordingly, the applicant further believes that an option for reducing the impact of surface morphology and, hence overall bonding, may involve controlling the extent of bonding by selecting a substrate having a surface roughness to reduce mechanical bonding between the formed pipe and the substrate.

The average surface roughness may be $R_a < 1.0$ μm. Preferably, the surface roughness may be $R_a < 0.5$ μm.

In regard to factor (c), the applicant believes that bonding may be affected by the chemical affinity of the formed pipe to the pipe-forming substrate.

The substrate may be formed of a material that has little or no chemical potential for bonding with titanium or titanium alloy.

In regard to factor (d), the applicant believes that bonding is affected by mechanical reactions of titanium or titanium alloy alloys particles impacting on the pipe-forming substrate or on a section of forming pipe. Again, without wishing to be bound by any particular theory, the applicant believes that the titanium or titanium alloy particles elastically deform on impact by flattening to an extent. For example, generally spherical particles deform to produce a disc or elongated shape. It is though that, while in that deformed shape, the particles are impacted with and bind with other particles that are also elastically deformed. After impact and binding, the resiliency of the elastic particles provides a tendency to revert to their original shape. The particles, however, bind together while in an expanded shape so the resilience manifests as a contraction of the formed pipe about the substrate.

For convenience, this effect will be referred to by the term "particle relaxation".

Spraying particles of titanium or titanium alloy in steps (b) and (c) may be in accordance with a cold-spray process disclosed in the CSIRO International application in order to form titanium or titanium alloy pipe.

In a second aspect, there is provided a titanium or titanium alloy pipe formed in accordance with the continuous forming method defined above.

The titanium or titanium alloy pipe may have a composition comprising:
 titanium: 99.8 wt %; and
 the balance comprising incidental impurities.

The titanium alloy pipe may alternatively have a composition comprising:
 titanium: 90 to 94 wt %; and
 aluminium and vanadium: 6 to 10 wt %; and
 the balance comprising incidental impurities.

This does not exclude other alloys of titanium where titanium is greater than any other single element either by atom or by weight.

The pipe may be formed by spraying particles selected to have different compositions. For example, pipe may be formed in accordance with the first aspect from particles having one or more different alloy compositions. Alternatively, the pipe may be formed of particles of titanium and particles of one or more different alloy compositions.

In these circumstances, the pipe may be formed with a generally homogenous composition or the pipe may be formed with a composition that is graded or otherwise varies along the length of the pipe.

In a third aspect, there is provided an apparatus for spray-forming pipe in accordance with the first aspect. The apparatus comprises:
(a) a substrate for forming pipe, the substrate being fitted with a sleeve of a section of pipe having an end face;
(b) means for rotating the substrate and pipe section about a longitudinal axis of the substrate; and
(c) means for cold-spraying particles of titanium or titanium alloy generally parallel to the longitudinal axis to impact the end face and to form seamless pipe.

The apparatus may further comprise compression means for applying a compressive force to the end face to compress particles that accumulate on the end face and to cause longitudinal movement of the formed seamless pipe relative to the substrate.

The substrate is preferably selected to provide sufficient friction to cause compression of accumulated particles by the compression means and to cause the longitudinal movement of the formed pipe relative to the substrate.

The apparatus may further comprise means for applying a compressive force to the formed pipe in a radial direction with respect to the direction of rotation of the substrate.

BRIEF DESCRIPTION OF THE DRAWINGS

Embodiments of the invention will now be described, by way of example only, with reference to the accompanying drawings in which.

DETAILED DESCRIPTION OF AN EMBODIMENT

The description of embodiments of the invention that follow is in the context of producing a seamless titanium alloy pipe from titanium alloy particles. However, it will be appreciated that the invention enables production of seamless pipe of titanium and/or titanium alloys and the description should not be interpreted as limiting the invention to producing titanium alloy pipe only.

Figure 1:
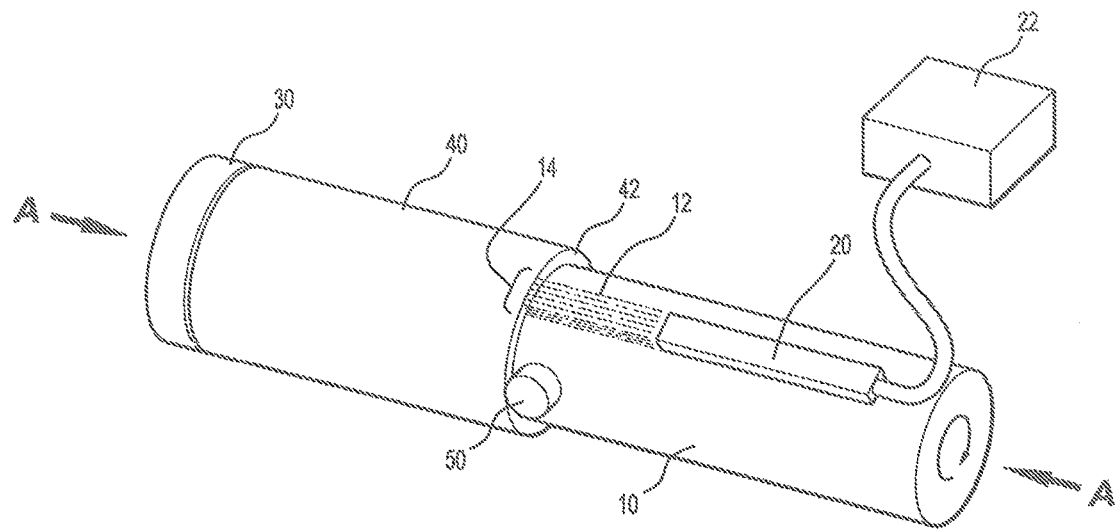
FIG. 1 is a schematic isometric view of a substrate and cross section view of a pipe-forming substrate and spraying arrangement before movement of the titanium or titanium alloy pipe relative to the pipe-forming substrate.

According to this embodiment, which is shown schematically in FIG. 1), a method for forming seamless pipe of titanium alloys involves providing a pipe-forming substrate, in the form of a mandrel 10, and a sleeve of a section of pipe, in the form of a starter pipe 30. The mandrel 10 is supported on a lathe (now shown) to rotate the mandrel about longitudinal axis A-A and to control the rate of rotation.

The starter pipe 30 is a tube having an internal diameter that closely receives, but is slightly larger than the outer diameter of the mandrel 10. They are in contact along a line that is parallel to the longitudinal axis of the mandrel 10 so that the axis of rotation of the mandrel 10 is off-set relative to an axis of rotation of the starter pipe 30. Closely adjacent the contact line the outer circumference of the mandrel 10 closely approximates the inner circumference of the starter pip 30 so as to form a deposition zone 14 for sprayed particles of pipe-forming material whereby the mandrel 10 operates as a pre-from for shaping pipe as it is formed. Further details of regarding operation the off-set mandrel are included in International application PCT/AU2010/001020 (published as WO2011/017752), which is incorporated herein.

The starter pipe 30 can be moved from a position with the mandrel 10 located within the starter pipe 30 and in a direction that is co-axial with a longitudinal axis A of the mandrel 10. During operation, the starter pipe 30 moves away from the mandrel 10 so the starter pipe 30 and the mandrel 10 are remote from each other.

Titanium alloy pipe 40 is formed by placing the mandrel 10 within the starter pipe 30 and rotating both in the same direction and at the same rate of rotation. A nozzle 20 of a cold-spraying apparatus is arranged such that a spray 12 exiting the nozzle 20 impinges upon an end face 42 of the starter pipe 30. This is achieved by arranging the nozzle 20 to direct spray 12 generally parallel to the longitudinal axis A-A of the mandrel 10. In this way the titanium alloy particles impact the end face 42 in the deposition zone 14 where the titanium alloy particles bond to the end face 42 and accumulate upon each rotation of the mandrel 10 and starter pipe 30. The accumulation of titanium alloy particles forms titanium alloy pipe 40 continuously and integrally as the spray 12 continues. The spray 12 comprises a jet of carrier gas (typically gas that does not react with titanium— such a nitrogen) and entrained titanium alloy particles.

The nozzle 20 is connected to a spray apparatus 22 to deliver a jet of carrier gas (typically gas that does not react with titanium—such a nitrogen) and entrained titanium alloy particles. The apparatus 22 and nozzle 20 used for spaying the titanium alloy particles is likely to be of conventional form and the basis of the equipment is as described and illustrated in U.S. Pat. No. 5,302,414. In general terms, the titanium alloy particles are entrained in the carrier gas and pass through a series of stages to accelerate the carrier gas and particles to supersonic velocities.

The spraying conditions, such as temperature, velocity, particle size and shape and distance between the nozzle 20 and the deposition zone 14, are in accordance with the spray forming method disclosed in the CSIRO International application referenced herein. The spraying conditions are incorporated herein by this reference. For example, the spraying conditions may be:

Equipment: CGT Kinetic 3000 or 4000
Number of supersonic nozzles: one or more
Mandrel speed: up to 600 RPM
Stand-off: 20-100 mm
Spray material: CP Titanium and/or titanium alloy powder
Particle diameter: 10-150 microns
Gas pressure: 10-40 bar
Gas: Helium, nitrogen, argon or air
Carrier gas: Helium, nitrogen, argon or air or mixtures thereof
Powder feed rate: above 10 g/min The nozzle 20 is typically positioned opposite the mandrel 10. The mandrel 10 is formed of a material and has properties selected to facilitate release of formed pipe 40 from the mandrel 10. The mandrel 10 is formed of Pyrex® (borosilicate glass) and has a hardness of 418 kg/mm$^2$ (Knoop 100) and a surface roughness $R_a<0.5$ μm. However, other materials can also be used, including such materials as ceramics, metal or composites. Examples of these materials include fused silica, diamond and tungsten.

The diameter of the mandrel 10 is 10 cm, but is selected according to the desired internal diameter of the formed pipe.

The end face 42 of the starter pipe 30 is initially placed a small distance longitudinally away from a roller 50 that has an axis of rotation on a radial line extending from the longitudinal axis A-A. The roller 50 is fixed in position and does not move relative to the mandrel 10.

During operation, accumulation of particles on the starter pipe 30 causes the titanium alloy pipe 40 to grow of the longitudinally over the mandrel 10 so the end face 42 advances toward the nozzle 20. Advancement of the ends face 42 is impeded when growth of the titanium alloy pipe 40 causes the end face to contact the roller 50. Further accumulation of particles and further growth causes the end face 42 to be compressed against the roller 50. As the roller 50 is fixed, the continued accumulation of particles on the end face 42 causes the titanium alloy pipe 40 and starter pipe 30 to be pushed longitudinally along the mandrel 10 away from the nozzle 20. Accordingly, the formed titanium alloy pipe 40 is moved along the mandrel and eventually off the mandrel as titanium alloy pipe is continually formed at the end face 42.

Figure 2:
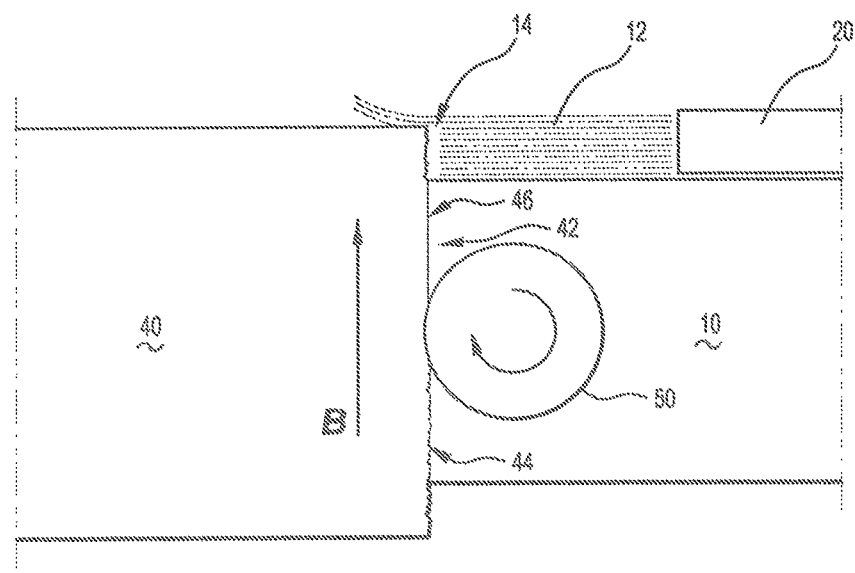
FIG. 2 is a schematic cross section view of the pipe-forming substrate and spraying arrangement in FIG. 1 during movement of the titanium or titanium alloy pipe relative to the pipe-forming substrate.

The compression applied to the end face by the roller 50 additionally reduces the porosity of formed titanium alloy pipe and improves strength properties. This effect is shown in FIG. 2 where a raw end face 44 is compressed by the roller 50 as the titanium alloy pipe 40 rotates. The compressed end face 46 then passes into the deposition zone 14 where more particles are bonded to and accumulate on the end face 42.

The compressive force applied by the roller 50 is a product of friction between the titanium alloy pipe 40 and the mandrel 10. Accordingly, the compressive force is adjusted by controlling the friction and the friction is controlled by selecting suitable mandrel conditions, including composition, temperature and roughness.

Although not shown in the drawings, the apparatus 22 may further comprise means for applying a compressive force to the formed pipe in a radial direction with respect to the direction of rotation of the substrate. The means may comprise a further roller that bears on the outer circumferential surface of the formed pipe. The further roller may bear on the surface adjacent the end face 42.

The friction and other compressive forces placed on the formed titanium alloy pipe 40 are controlled to provide a suitable compressive force to reduce porosity of the formed titanium alloy pipe 40 and to enable the formed titanium alloy pipe 40 to move along the mandrel 10 away from the nozzle 50.

When the desired length of formed pipe 40 is reached, the starter pipe 30 is cut away and the opposite end is removed from the mandrel 10 and is finished by removing any partially formed pipe. Alternatively, the method may be operated on a continuous basis and sections of pipe of a desired length are removed from the titanium alloy pipe 40 as the method continues.

Many modifications may be made to the preferred embodiment of the present invention as described above without departing from the spirit and scope of the present invention.

It will be understood that the term "comprises" or its grammatical variants as used in this specification and claims is equivalent to the term "includes" and is not to be taken as excluding the presence of other features or elements.

It is to be understood that references herein to patents and patent applications do not constitute an admission that they form a part of the common general knowledge in the art in Australia or any other country.

The invention claimed is:

1. A method of forming sections of seamless titanium or titanium alloy pipe, the method comprising the steps of:
    (a) providing a substrate for forming pipe and a sleeve of a section of pipe on the substrate, the pipe section having an end from which the substrate projects;
    (b) spraying particles of titanium or titanium alloy generally parallel to a longitudinal axis of the substrate to impact an end face of the end and to cause particles to bond to and to accumulate on the pipe end face to form pipe; and
    (c) moving formed pipe longitudinally relative to the substrate to remove formed pipe from the pipe-forming substrate and continuing to spray titanium or titanium alloy particles onto the end face to cause further pipe to form continuously and integrally with the formed pipe, thereby enabling formation of a seamless titanium or titanium alloy pipe of a desired length;
    wherein step (c) comprises a step of applying a compressive force to accumulated particles on the end face of the pipe by a fixed roller, whereby growth of the titanium or titanium alloy pipe causes longitudinal movement of formed pipe relative to the substrate.

2. The method defined in claim 1, wherein step (b) comprises evenly distributing sprayed particles over the face to cause even growth of the formed pipe by rotating the substrate and pipe relative to the particle spray.

3. The method defined in claim 2, wherein step (b) comprises spraying particles onto the end face via a plurality of spray nozzles.

4. The method defined in claim 1, wherein the method further comprises compressing formed pipe to reduce porosity of the formed pipe.

5. The method defined in claim 4, wherein the compressive force is applied to an outwardly facing, circumferential curved surface of the pipe.

6. The method defined in claim 1, wherein the step of compressing the pipe includes controlling the compressive force.

7. The method defined in claim 6, wherein compressive force is controlled by controlling friction between the substrate and the formed pipe or the pipe section or by applying a load on the pipe opposite to the compressive load.

8. The method defined in claim 7, wherein controlling the friction comprises selecting a substrate to provide sufficient friction to longitudinal movement of the formed pipe so that the compressive force applied by the roller causes compression of accumulated particles.

9. The method defined in claim 8, wherein controlling friction comprises controlling the extent of bonding between formed titanium or titanium alloy pipe and the substrate to enable formed pipe to be moved relative to the substrate.

10. The method defined in claim 9, wherein the extent of bonding is controlled by heating the formed titanium or titanium alloy pipe to cause differential thermal expansion of the formed pipe relative to the substrate, thereby releasing the formed pipe from the pipe forming substrate and enabling the formed pipe to be moved relative to the substrate.

11. The method defined in claim 9, wherein the extent of bonding is controlled by cooling the substrate to cause differential thermal expansion of the formed pipe relative to the substrate, thereby releasing the formed pipe from the pipe forming substrate and enabling the formed pipe to be move relative to the substrate.

12. The method defined in claim 9, wherein the method comprises controlling the extent of bonding by selecting a substrate having a co-efficient of thermal expansion that is less than the co-efficient of thermal expansion of the titanium or titanium alloy.

13. The method defined in claim 9, wherein the method comprises controlling the extent of bonding by selecting a substrate having a particular surface roughness.

14. The method defined in claim 13, wherein the average surface roughness of the substrate is $R_a < 1.0$ μm.

15. The method defined in claim 9, wherein the substrate is formed of a material that is selected based on its potential for bonding chemically with titanium or titanium alloy.

* * * * *